United States Patent

[11] 3,590,349

| [72] | Inventor | Mohammed Safiuddin<br>North Tonawanda, N.Y. |
|---|---|---|
| [21] | Appl. No. | 821,372 |
| [22] | Filed | May 2, 1969 |
| [45] | Patented | June 29, 1971 |
| [73] | Assignee | Westinghouse Electric Corporation<br>Pittsburgh, Pa. |

[54] VOLTAGE UNBALANCE DETECTOR FOR SERIES-CONNECTED MOTORS DRIVEN BY A COMMON POWER SOURCE
6 Claims, 4 Drawing Figs.

[52] U.S. Cl. .................................... 318/98,
                                              318/113
[51] Int. Cl. ...................................... H02p 7/74
[50] Field of Search ............................. 318/52, 99,
                                               98, 113

[56] References Cited
UNITED STATES PATENTS
715,195  12/1902  Case ........................ 318/52

2,209,826  7/1940  Ogden ........................ 318/52
2,215,341  9/1940  Weybrew ..................... 318/52

Primary Examiner—Benjamin Dobeck
Attorneys—F. H. Henson, R. G. Brodahl and C. J. Paznokas ABSTRACT: Described is a system for detecting the absence of a load on one of the two drive motors connected in series across a common source of driving potential. This is accomplished by connecting an electrical condition detection device, for example a low amperage circuit breaker, across both motors whereby shunt currents tending to flow around the respective motors and through the breaker will normally oppose each other and prevent tripping of the breaker. However, when the load on one of the motors is removed because of breakage of a pinion gear or the like, the voltages across the motors become unbalanced, the opposing currents tending to flow through the circuit breaker are no longer equal, and the breaker is caused to trip.

PATENTED JUN29 1971

3,590,349

INVENTOR
Mohammed Safiuddin
BY
Clement Poznakas
ATTORNEY

3,590,349

VOLTAGE UNBALANCE DETECTOR FOR SERIES-CONNECTED MOTORS DRIVEN BY A COMMON POWER SOURCE

BACKGROUND OF THE INVENTION

There are many applications for direct current electric motors wherein two such motors are connected in series across a single source of driving potential, such as that derived from a generator or thyristor power supply. For example, swing drive motors which cause the cab and boom of an excavating shovel to rotate about a vertical axis are usually provided in an even number, connected across dual voltage generators in series-connected pairs of two motors each. Since all of these motors are geared to a common drum, all must rotate at the same speed. Furthermore, both motors connected across each generator carry the same current, thus sharing equal loads if the field flux of the respective motors in each pair is assumed to be equal.

It can be shown by mathematical analysis that if the load on any of these motors is removed as will occur, for example, if a pinion on a motor breaks, the loop containing that motor will not share any load; and a voltage unbalance will exist in the counter electromotive forces of the motors, equal to the current-resistance drop of the motor-generator loop. If this condition exists in any of the unregulated slave loops, no indication to the operating personnel will be given; and the drive will operate with two of its drive motors not sharing the load. Thus, to obtain an indication of this faulty operation, some type of voltage unbalance detection system is required.

In the past, attempts have been made to detect an unbalanced voltage condition in two series-connected motors by two adjustable voltage relates which are connected across the motors such that one coil of each relay is across each motor opposing the ampere turns of the coil of the other relay. Under balanced voltage conditions, each coil of each relay has equal ampere turns and each relay has zero net ampere turns. Under unbalanced conditions, however, the balance of the relay ampere turns is upset and the relay picks up. While this scheme is sound in principle, it has never worked satisfactorily for excavation shovels due, among other things, to a change in coil resistance because of temperature changes and unreliable operation of the adjustable voltage relays under shovel vibrations.

SUMMARY OF THE INVENTION

As one object, the present invention seeks to provide a system for detecting the absence of a load on one of two motors connected in series across a common source of driving potential, which system overcomes the disadvantages of prior art systems utilizing adjustable voltage relays.

More specifically, an object of the invention is to provide a system of the type described which utilizes only one sensing device in shunt with both motors, is less expensive than prior art systems, is not influenced by ambient temperature variations, and is capable of indicating a ground fault as well as the absence of a load on one of two motors.

In accordance with one embodiment of the invention a fault detection system is provided comprising a trip-type indicating device having an energizing coil and a solenoid armature actuable by the coil. This coil is connected in shunt with each of two motors connected in series, preferably by means of resistors which connect one end of the coil to the uncommon terminals of the respective motors, the other end of the coil being connected to the interconnected or common terminals of the motors. Normally, opposing currents tending to flow through the shunt paths around the motors are essentially equal since the voltages across the motors are also equal. Hence, since the opposing currents are equal, they cancel each other and the coil is not energized to actuate the solenoid armature. However, if the voltages across the motors should become unbalanced as when a shaft or pinion on one of the motors breaks and the counter electromotive forces of the motors are no longer equal, the opposing currents in the shunt paths are no longer equal either and the coil is energized to actuate the solenoid armature. Contacts connected to the armature can then be used in external circuitry to indicate the unbalanced condition. Preferably, the aforesaid coil is incorporated into a low amperage circuit breaker which, when tripped, interrupts the shunt current paths when a voltage unbalance condition exists. Once tripped, the circuit breaker must be reset even though the fault should be removed.

Further, in accordance with the invention, a ground detection system is incorporated into the circuit by connecting a resistor between the junction of the two resistors in the shunt paths and ground. If one of the motor terminals should become grounded, the currents in the two shunt paths will again be unequal, causing the circuit breaker to trip and indicate the fault.

The above and other objects and features of the invention will become apparent from the following detailed description taken in connection with the accompanying drawings which form a part of this specification, and in which.

Figure 1:
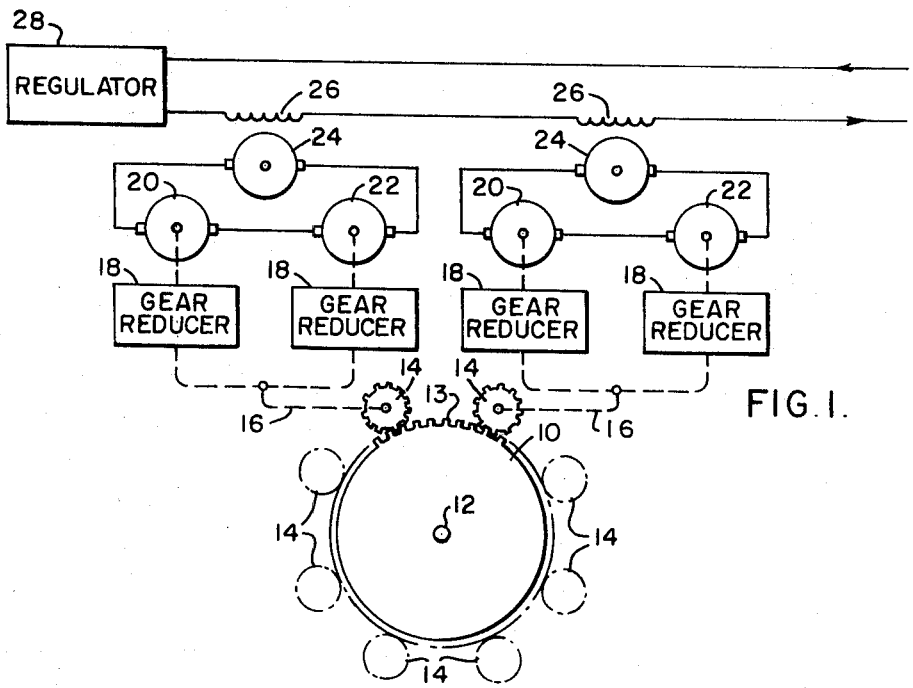
FIG. 1 is a schematic illustration of one type of drive system with which the present invention may be used.

With reference now to the drawings, and particularly to FIG. 1, a swing drive for an excavating shovel is shown and includes a large bull gear 10 which rotates about a pivot 12 mounted on a stationary support, now shown. The bull gear 10, in turn, is connected to the cab and boom of the excavating shovel such that as the gear rotates, so also will the cab and boom.

Meshing with teeth 13 formed around the outer periphery of the bull gear 10 is a plurality of pinion gears 14, only two such gears being shown in full lines in FIG. 1. Each gear 14, in turn, is connected through a mechanical linkage 16 and a gear reducer 18 to one of two series-connected drive motors 20 and 22. The drive motors 20 and 22, in turn, are driven by means of a generator 24. The field windings 26 for each of the generators 24 for each set of motors 20, 22 are connected to a common regulator 28 which senses the voltage and/or current across one set of motors 20, 22 and regulates all of the motors utilized to drive the pinion gears 14 spaced around the bull gear 10.

As was mentioned above, it sometimes happens that a gear in the gear reducer 18 breaks, or possibly a motor shaft. As long as both motors are connected through gear reducers 18 to the pinion gear 14, the voltages across the respective motors are essentially the same. However, when the load is removed from one of the motors, the counter electromotive forces of the two motors are not the same; and in the absence of some detection system, the operation would not know of this fact. That is, the other motors utilized to drive the bull gear would simply carry the entire load.

In an effort to provide a detection system, two adjustable voltage relays have been connected across the respective motors 20 and 22 in each set such that one coil of each relay is across each motor opposing the ampere turns of the coil of the other relay. Under normal, balanced voltage conditions, each coil of each relay has equal ampere turns and each relay has zero net ampere turns. However, under unbalanced conditions, the balance the relay ampere turns is upset and the relay picks up. The difficulty with the method has been changes in coil resistance due to temperature changes and unreliable operation of the adjustable voltage relays under excavating shovel vibrations.

Figure 2:
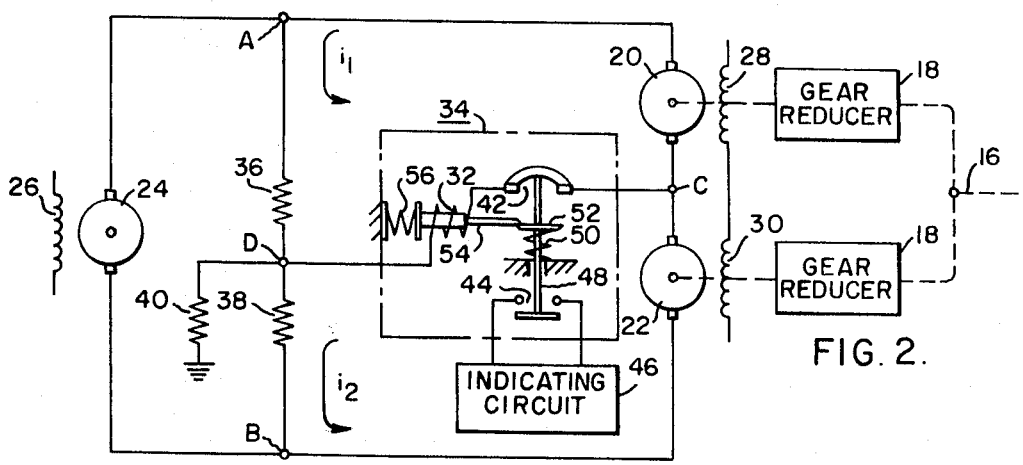
FIG. 2 is a schematic circuit diagram of the fault detection system of the invention.

The system of the present invention for detecting the absence of a load on one of two motors is shown in FIG. 2 wherein a generator 24 is again shown and supplies power to the rotors of two series-connected direct current motors 20 and 22. Generator 24 is again provided with a field winding 26; and, similarly, the motors 20 and 22 are provided with field windings 28 and 30 connected to a common source of field supply voltage, not shown. Connected in shunt with the motor 20 is a resistor 36 and the input circuit element of an electrical condition detection system, for example, the energizing winding 32 of a circuit breaker 34. Similarly, in shunt with motor 22 is the same energizing coil 32 of the circuit breaker 34 and a resistor 38. Connected between the junction of resistors 36 and 38 is a resistor 40 which provides a means for detecting ground faults, as will hereinafter be explained.

The circuit breaker 34 may for example be Type AM12 manufactured by Heinemann Electric Company of Trenton, New Jersey and described in their bulletin 202 dated June 1968. Essentially, it is a hydraulic-magnetic circuit breaker having an inherent resistance of about 900 to 1000 ohms and a trip level of about 20 milliamperes. The breaker 34 is provided with main contacts 42 which break the shunt paths around the motors 20 and 22 when the breaker is tripped, and an external set of contacts 44 which are closed when the breaker is tripped to activate indicating circuitry 46.

The status or position of contacts 42 and 44 is controlled by an operating bar 48 which is upwardly biased by a compression spring 50 that bears against a collar 52 fixed to the bar 48. Normally the breaker contacts 42 are held in the reset or closed position and contacts 44 are held open by a latch element 54 biased to the right by a compression spring 56. The latch element 54 by restraining upward movement of the collar 52, holds the breaker mechanism in the "cocked" position shown in the drawing. The latch element 54 is ferromagnetic and is effectively an armature which is driven to the left when the trip coil 32 is energized thus to trip the breaker to open the contacts 42 and close the contacts 44. The breaker stays tripped until reset for example manually. As will be appreciated, each of the sets of drive motors around the bull gear 10 shown in FIG. 1 will be provided with a suitable indicating circuit 46 to notify the operator as to which one of the sets of motors is operating with no load on one of the two motors.

Figure 3:
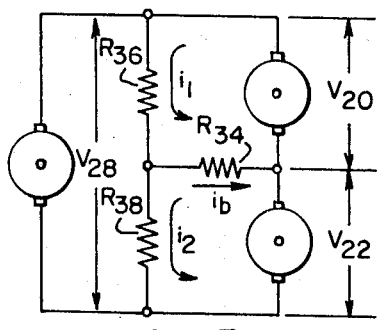
FIG. 3 is an equivalent circuit diagram for the circuit of FIG. 2 illustrating the operation of the invention in a case where the voltages across the two series-connected motors become unbalanced.
Figure 4:
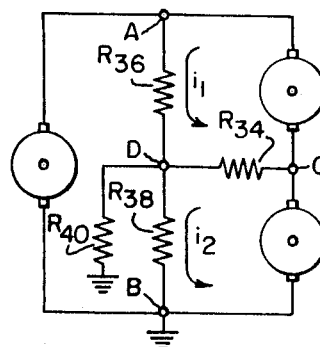
FIG. 4 is an equivalent circuit diagram for the circuit of FIG. 2 illustrating the operation of the invention under conditions wherein a ground fault occurs.

The operation of the circuit of FIG. 2 can best be understood by reference to FIGS. 3 and 4. In FIG. 3, the current $i_b$ is the difference of the two loop currents $i_1$ and $i_2$; $V_{28}$ is the voltage across generator 28; $R_{36}$ and $R_{38}$ are the resistances of resistors 36 and 38; $V_{20}$ and $V_{22}$ are the voltages across motors 20 and 22; and $R_{34}$ is the internal resistance of the breaker. Any unbalance in voltages $V_{20}$ and $V_{22}$ greater than $i_t (R_{36} + R_{34}$ or $i_t(R_{38} + R_{34})$ will trip the breaker, $i_t$ being the trip rating of the breaker. In the system, motors 20 and 22 are matched and resistors 36 and 38 both have the same resistance value, which may be symbolized as $R_X$. Thus $R_{36} = R_{38} = R_X$.

Adding the resistor 40 between the junction of resistors 36 and 38 and ground will provide a ground detection system in case of a ground fault at either of the terminals A and B. This is explained in FIG. 4. Let us assume, for example, that terminal B becomes grounded. In this case, the current $i_2$ will flow through both resistors 38 and 40 in parallel. However, the current $i_1$ will flow through resistor 36 only. The result is an effective lowering of the impedance presented to the current $i_2$, whereupon the two currents $i_1$ and $i_2$ become unbalanced and the circuit breaker 34 is again tripped.

It can be mathematically shown that the selection of the value of resistance $R_{40}$ depends upon the desired voltage limit between points C and D in FIG. 4. It can be shown, for example, that for a breaker of Type AM 12 manufactured by Heinemann Electric Company, which is rated at 50 volts direct current, 20 milliamperes and has a 900 ohm internal impedance, a value for resistance $R_{40}$ of 5.5 $R_X$ will limit the voltage across the breaker 34 to 50 volts direct current at maximum generator volts of 1200 volts. When $R_X$ is 1200 ohms, tripping of the breaker occurs at an unbalance of 42 volts in the motor voltages.

The system of FIG. 2 may also be viewed as a bridge wherein components 20, 22, 36 and 38, are the branches of the bridge, terminals A and B are across the input diagonal of the bridge, and terminals D and C are across the output diagonal. When the bridge is balanced there is no potential difference between terminals D and C, and coil 32 is unenergized. However, when the voltages across the respective motors 20 and 22 are unequal, the bridge is unbalanced to produce a voltage across terminals D and C, thus resulting in current through coil 32.

Although the invention has been shown in connection with a certain specific embodiment, it will be readily apparent to those skilled in the art that various changes in form and arrangement of parts may be made to suit requirements without departing from the spirit and scope of the invention. In this respect, it will be apparent that the generator 24 could be replaced, for example, by a thyristor power supply.

I claim as my invention:

1. In a motor control system for an excavating shovel bull gear drive a pair of motors connected in series across a power source and having their output shafts connected through spur gears to the excavating shovel bull gear whereby both motors will rotate at the same speed, trip-type indicating means having an energizing element which will activate said indicating means to indicate a fault, the indication of a fault persisting until said indicating means is reset, a first shunt circuit connected across one of said motors, a second shunt circuit connected across the other of said motors, said energizing element being included in and common to both shunt circuits whereby current will not flow through said energizing element when the voltages across the respective motors are equal but will flow through said energizing element when the voltages across the respective motors are not equal to activate said trip-type indicating means to indicate the existence of an unbalanced voltage condition across the motors until reset.

2. The fault detection system of claim 1 including an indicating circuit connected to said trip-type indicating means for indicating a fault when said energizing element is energized.

3. The fault detection system of claim 1 wherein said power source is connected across the rotors of said motors in series.

4. The fault detection system of 1 wherein said energizing element is included in a current path one end of which is connected to the junction of the two-series connected motors, said system including a first resistor connecting the other end of said current path to the other terminal of one of said motors, and a second resistor connecting the other end of said current path to the other terminal of the other of said motors.

5. The fault detection system of claim 2 wherein one end of said energizing element is connected to the junction of the two-series connected motors, said system including a first resistor connecting the other end of said element to the other terminal of one of said motors, and a second resistor connecting the other end of said element to the other terminal of the other of said motors.

6. In a motor control system, a pair of motors connected in series across a power source with one terminal of one motor being connected to one terminal of the other motor, indicating means having an energizing element which will activate said indicating means to indicate a fault, said energizing element being included in a current path one end of which is connected to the junction of the two series-connected motors, a first resistor connecting the other end of said current path to the other terminal of one of said motors, a second resistor connecting the other end of said current path to the other terminal of the other of said motors whereby current will not flow through said energizing element when the voltages across the respective motors are equal but will flow through said energizing element when the voltages across the respective motors are not equal to activate said indicating means to indicate the existence of an unbalanced voltage condition across the motors, and a third resistor connecting the junction of said first and second resistors to ground, such that when one of said other terminals of the motors becomes grounded an unbalanced current condition will exist in said current path to energize said energizing element.